Figure 1:
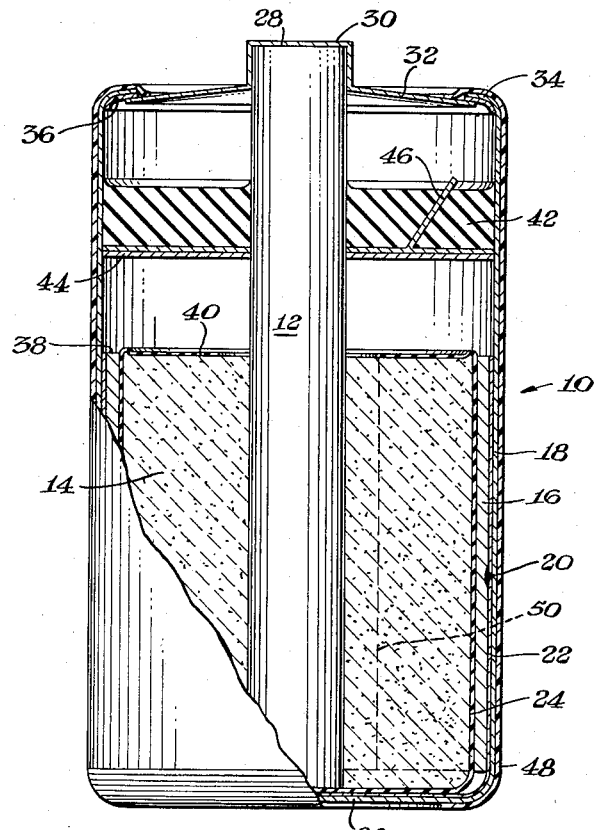

July 29, 1958  C. W. GLESNER, JR  2,845,471

PRIMARY CELL

Filed Aug. 8, 1955

INVENTOR.
Charles W. Glesner, Jr.

BY

Griswold & Burdick
ATTORNEYS

United States Patent Office 2,845,471
Patented July 29, 1958

2,845,471

PRIMARY CELL

Charles W. Glesner, Midland, Mich., assignor to The Dow Chemical Company, Midland, Mich., a corporation of Delaware Application August 8, 1955, Serial No. 526,840

4 Claims. (Cl. 136—101)

This invention relates to an improved primary cell of the dry or nonspillable type, and particularly to dry cells in which the anode material is magnesium.

Dry cell formulations employing magnesium as the anode material are disclosed in a paper by R. C. Kirk and A. B. Fry, "Magnesium Dry Cells," published in the "Journal of Electro-chemical Society," vol. 94, No. 6, pages 277 to 289, inclusive.

In making up magnesium primary cells, as mentioned in U. S. Patent No. 2,616,940, "the usual procedure is to form the anode materal into a cup or 'battery can' which constitutes one of the electrodes of the cell as well as the container holding the cathode elements and the electrolyte. The cathode mix consists of manganese dioxide having intimately mixed with it usually between about 5 and 15 percent of finely divided carbon, such as acetylene black, by weight. The mixture is moistened with enough electrolyte to make it moldable and the moldable mixture is formed into 'bobbins' around a central electrode in the form of a rod of carbon or graphite. These bobbins are usually cylindrical moldings somewhat smaller than the battery can and are inserted into the cans after the cans are lined with starch paste or gelled electrolyte or a porous non-conductor, such as cloth or paper, to keep the bobbin from touching the can. In some instances the cathode mix is introduced into the lined cans without previously forming the cathode mix into a bobbin, the molding taking place in the lined can. In such instances, after placing the cathode mix in the can the carbon or graphite rod is pushed centrally into the cathode mix as the other electrode."

Similar dry cell formulations are disclosed in U. S. Patents 2,547,907 and 2,547,908. U. S. Patent 2,616,940 discloses that in the cells having the foregoing formulations the can or lining may be dispensed with and the cathode mix may be placed directly against the inside of the can or cup in assembling the cell elements.

Dry cells formulated as above described (with or without lining the can) are usually sealed at the top. Sealing is accomplished by placing a cardboard or similar porous dielectric washer in the top of the can over the end of the carbon rod a short distance above the cathode mix. Then a layer of sealing compound, such as a rosin-base sealing wax, coal tar or asphalt pitch, is poured over the washer so as to fill the annular space at the top of the can above the washer.

While dry cells made in the above described manner give excellent performance, they are not of the so-called leak proof variety which are in wide demand as flashlight batteries. Also the use of a magnesium cup anode is uneconomical from the standpoint of the bobbin size and amount of electrolyte contained in the cell. That is, an unbalance of materials exists because a can or cup anode of the flashlight cell cannot hold enough cathode mix and electrolyte to completely consume a cup-shaped extruded anode (of sufficient wall thickness to serve as a container for the cell) during the useful life of the cell. It is realized of course that the anode cup should not be consumed if the cup is to be used as the container of the cell. However, using expensive anode material both as the cell container and as an anode is uneconomical.

To provide a better balance of materials in primary cells, it has been suggested that a steel cup replace the magnesium cup anode and a separate magnesium anode (made of sheet stock curved to cylindrical form, for example) be inserted in the steel cup. The anode is of appropriate weight and size to chemically match the cathode mix and electrolyte which are inserted in the steel cup. In such primary cells the anode material serves the additional function of cathodically protecting the steel cup or container of the battery (to which the anode is electrically connected).

Such primary cells are disclosed and claimed in Raymond W. Reid and Roy C. Kirk's co-pending application Serial No. 526,912, "Magnesium Anode Primary Cell," filed August 8, 1955.

A principal object of this invention is to provide an improved dry cell of the so-called leak proof variety which has a long useful life, high output voltage and efficiency and is economical to manufacture.

Another object of this invention is to provide improved means for prevention of unwanted corrosion of metal parts of the cell. In accordance with this invention, primary cells contained in steel cups and having tubular magnesium anodes in juxtaposition to the walls of the cup are provided with a grease or oil seal or coating between the juxtaposed surfaces of the anode and the cup. The anode, however, is directly connected with the cup by means of at least one weld.

Figure 2:
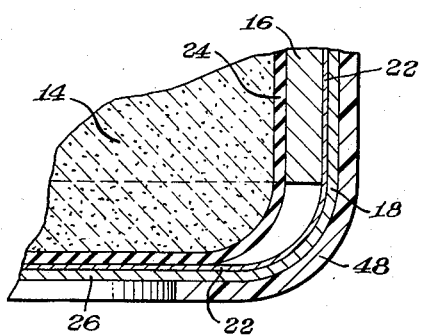

The invention, as well as additional objects and advantages thereof, will best be understood when the following detailed description is read in connection with the accompanying drawings, in which;

Fig. 1 is a side elevational view, partly in section, of a primary cell made in accordance with this invention, and Fig. 2 is a fragmentary view, on an enlarged scale and in section, of the lower part of the cell shown in Fig. 1.

Referring to the drawings, there is shown a primary cell, indicated generally by the numeral 10, comprising a cathode electrode 12, cathode mix 14 including electrolyte, and a tubular shaped magnesium anode 16 encased in a steel can 18. The anode 16 is not in overall direct contact with the can 18 although the anode is welded to the can, as at 20, in at least one place. The anode 16 is an open ended anode. That is, open at both the top and bottom thereof.

In accordance with this invention, the bottom and sides of the can 18 are coated with a non-hardening insulating oleaginous material 22, such as grease or oil. The grease or oil 22 extends at least to the top 38 of the anode 16. The cathode mix 14 is contained in a paper separator bag 24 which fits within the anode 16 and rests on the insulating material 22 at the bottom of the can 18. The cathode electrode 12, which is a carbon or graphite rod within the bag 24, is axially disposed with respect to the can 18. The lower end of the electrode rod 12 lies against the bottom of the paper bag 14 and is insulated from the bottom 26 of the can or cup 18 by the bag 24 and the coating 22 of grease or oil.

The top 28 of the cathode terminal electrode 12 extends above the top of the steel can 18 and is held in position by a somewhat hat-shaped cover plate 30 whose periphery or "brim" 32 extends to and is insulated from the turned-in upper end 34 of the steel can 18. Insulation between the can 18 and cover plate 30 is provided by a paper ring or annulus 36 which separates the two parts.

The magnesium anode 16 extends about ⅔ of the length of the steel can 18.

The cathode mix 14 extends between the carbon rod 12 and the anode 16. The mix 14 is in direct contact with the carbon rod 12 but is separated from direct contact with the anode 16 by the paper bag 24 in which the mix is contained. The cathode mix 14 extends to or near to the top 38 of the anode 16, and the upper wall 40 of the paper separation bag 24 is turned in towards the carbon rod 12 to help prevent the spilling of cathode mix 14 directly onto the anode 16.

A tar seal 42 is provided between the carbon rod 12 and the steel cup 18. An apertured paper washer 44 is fitted between the carbon rod 12 and the can 18 to provide the base on which the tar seal 42 is poured. A paper tab 46 extending upwardly from the washer 44 through the tar seal 42 provides the means by which gas generated within the cell 10, while current is drawn therefrom, is vented to the upper portion of the cell which is not sealed in a gas tight manner. Alternatively, a porous carbon rod 12 may be used to vent gases from the cell. In such cases the cover plate 30 usually contains a small aperture adjacent to the rod 12. The volume between the top of the anode 16 and the seal 42 is needed because gases may be generated within the cell at a faster rate than they may be vented through the tab 46. The additional space between the tar seal 42 and the cover plate 30 is provided in order that a specific cell dimension may be maintained, e. g., a standard length flashlight cell as established for zinc anode type cells.

In order that two or more of the cells 10 will not short out when connected in series in a metal cased flashlight, an insulating plastic coating 48 is provided on the side walls and part of the ends of the can 18. It should be emphasized that the insulating coating may be dispensed with if the cells are to be used in parallel or even if connected in series if the cells are used in an electrically non-conductive container.

Formulations of suitable electrolytes and dry mixes for dry cells having magnesium for the anode material are disclosed in the aforementioned U. S. Patents 2,547,907; 2,547,908; 2,606,940 and paper by Kirk and Fry.

The anode 16 in a specific cell made in accordance with this invention is composed of AZ31A alloy sheet of .030 wall thickness rolled to form a cylinder 1.25 inches in diameter and 1.5 inches high. In addition to magnesium, AZ31A alloy contains nominally 3 percent aluminum, 1 percent zinc and about .15 percent calcium. The anode cylinder 16 fits closely within the drawn steel can 18 with the bottom edge 50 of the anode 16 at or near to the bottom 26 of the can 18. The coating 22 of grease or oil may be applied in any convenient manner, as by swabbing the inner surfaces of the can. It has been found, however, that when a few drops of light oil are placed in the bottom of the can, the oil film extends between the can wall and the anode, by means of capillary attraction, it is assumed. Thus the welds 20 between the anode 16 and can 18 may be made before any film is provided between the anode 16 and can 18. Welds made before the oil film is present are less critical to make than are welds made through an insulating film.

It has been discovered, however, that by using a welding electrode having an inside tip, a satisfactory spot weld may easily be made between the anode 16 and can 18 directly through the grease or oil film 22.

In as much as the oil or grease coating covers both the walls of the steel can 18 and the "can" side of the anode 16, both anode and can surfaces are protected from corrosion and consequently the can 18 neither leaks due to excess corrosion nor bursts due to localized pressure buildups between the anode 16 and can 18.

The anode 16 is preferably welded (spot welded, for example) to the can 18 at least one point, the location of the weld 20 being about midway between the ends of the anode 16. Usually 3 welds, spaced approximately symmetrically around the anode 16, are used. The edges (dotted line 50 in Fig. 1) of the anode sheet which are in juxtaposition with each other are usually separated by .005 inch or less in order to prevent an excessive amount of electrolyte from passing between the juxtaposed edges (shown as the dotted line 52 in Fig. 1) and being dispersed between the anode 16 and the cup 18.

Cup grease or oil such as SAE No. 60 has provided satisfactory coatings 22.

It has been found that the weld area of the anode 16 is apparently cathodic with respect to the remainder of the anode 16 and thus is cathodically protected by the remainder of the anode. Good electrical contact is thus maintained between the anode and the steel cup until the anode is substantially completely consumed.

Thus, primary cells made in accordance with this invention are leak proof, make efficient use of the anode material to provide a long useful life and are economical to manufacture.

I claim:

1. A primary cell comprising a steel cup of tubular cross sectional configuration and which is a terminal electrode of said cell, the side wall of said cup being substantially perpendicular to the bottom of said cup, a hollow, cylindrically shaped open ended magnesium anode disposed within and in close fitting relationship with the side wall of said cup, the lower edge of said anode being disposed at least near to the bottom of said cup, a layer of oleaginous material disposed between and adhering to the wall of said cup and said anode, a welded connection between said anode and the wall of said cup, a carbon cathode electrode disposed in said cup with one end projecting beyond the cup, the cathode electrode being insulated from the bottom of the cup, and a cathode depolarizing mixture comprising manganese dioxide and carbon black moistened with an aqueous electrolyte, the mixture being interposed between the cathode electrode and the anode.

2. A primary cell comprising a drawn steel cup of tubular cross sectional configuration and which is a terminal electrode of said cell, the side wall of said cup being substantially perpendicular to the bottom of said cup, a hollow, cylindrically shaped open ended magnesium anode disposed within and in close fitting relationship with the side wall of said cup, the lower edge of said anode being disposed at least near to the bottom of said cup, a layer of grease disposed between and adhering to the wall of said cup and said anode, a welded connection between said anode and the wall of said cup, a carbon cathode electrode disposed in said cup with one end projecting beyond the cup, the cathode electrode being insulated from the bottom of the cup, and a cathode depolarizing mixture comprising manganese dioxide and carbon black moistened with an aqueous electrolyte, the mixture being interposed between the cathode electrode and the anode.

3. A primary cell comprising a drawn steel cup of tubular cross sectional configuration and which is a terminal electrode of said cell, the side wall of said cup being substantially perpendicular to the bottom of said cup, a hollow, cylindrically shaped open ended magnesium anode disposed within and in close fitting relationship with the side wall of said cup, the lower edge of said anode being disposed at least near to the bottom of said cup, a layer of oil disposed between and adhering to the wall of said cup and said anode, a welded connection between said anode and the wall of said cup, a carbon cathode electrode disposed in said cup with one end projecting beyond the cup, the cathode electrode being insulated from the bottom of the cup, and a cathode depolarizing mixture comprising manganese dioxide and carbon black moistened with an aqueous electrolyte, the mixture being interposed between the cathode electrode and the anode.

4. A primary cell comprising a drawn steel cup of tubular cross sectional configuration and which is a terminal electrode of said cell, the side wall of said cup being substantially perpendicular to the bottom of said cup, a hollow, cylindrically shaped open ended magnesium anode disposed within and in close fitting relationship with the side wall of said cup, the lower edge of said anode being disposed at least near to the bottom of said cup, a layer of oleaginous material disposed on the bottom of said cup and between and adhering to the wall of said cup and said anode, a welded connection between said anode and the wall of said cup, a carbon cathode electrode disposed in said cup with one end projecting beyond the cup, the cathode electrode being insulated from the bottom of the cup, and a cathode depolarizing mixture comprising manganese dioxide and carbon black moistened with an aqueous electrolyte, the mixture being interposed between the cathode electrode and the anode, said manganese dioxide, lampblack and at least a part of said carbon cathode being contained in a paper bag whose sides are in juxtaposition with said anode.

References Cited in the file of this patent
UNITED STATES PATENTS

| | | |
|---|---|---|
| 905,952 | Szek | Dec. 8, 1908 |
| 1,048,773 | White | Dec. 31, 1912 |
| 1,115,458 | Waitt | Oct. 27, 1914 |
| 1,352,834 | Ruhoff | Sept. 14, 1920 |
| 2,198,423 | Anthony | Apr. 23, 1940 |
| 2,474,716 | Beechlyn | June 28, 1949 |
| 2,490,598 | Oliver | Dec. 6, 1949 |
| 2,536,697 | Ruben | Jan. 2, 1951 |
| 2,547,908 | Fry et al. | Apr. 3, 1951 |
| 2,697,738 | Glesner | Dec. 21, 1954 |